L. M. GANONG.
COTTON CULTIVATOR.
No. 105,326.  Patented July 12, 1870.
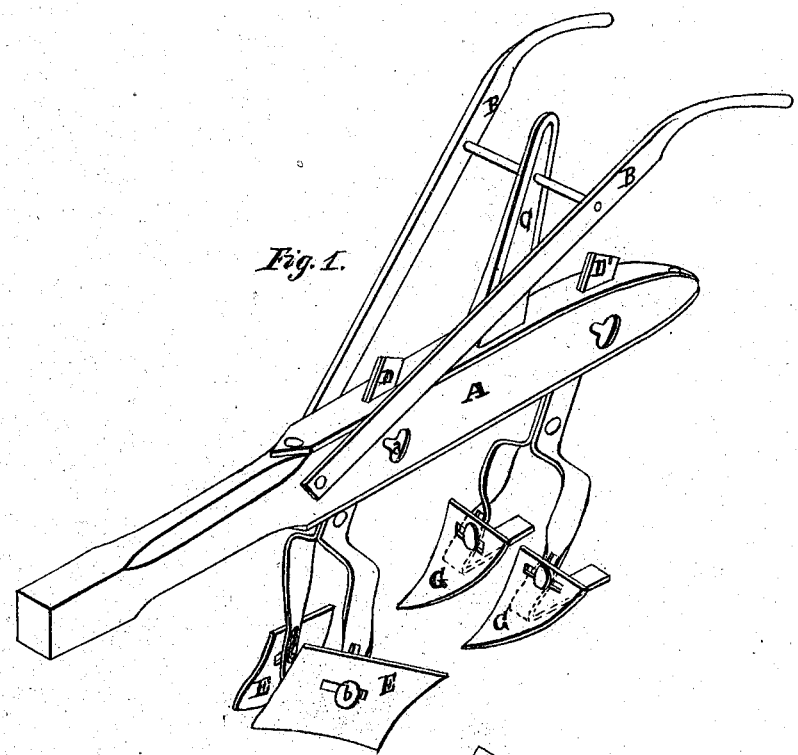
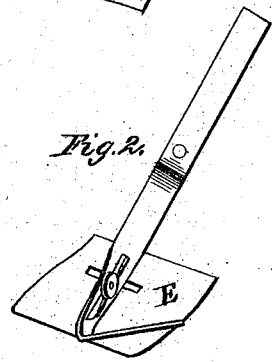
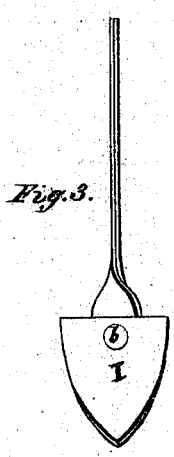
Witnesses:
Jno. A. Ellis
J. V. White
Inventor
Luther M. Ganong
Per
J. H. Alexander
Atty

UNITED STATES PATENT OFFICE.

LUTHER M. GANONG, OF FRIAR'S POINT, MISSISSIPPI.

IMPROVEMENT IN COTTON-CULTIVATORS.

Specification forming part of Letters Patent No. 105,326, dated July 12, 1870.

*To all whom it may concern:*

Be it known that I, LUTHER M. GANONG, of Friar's Point, in the county of Coahoma and State of Mississippi, have invented certain new and useful Improvements in Cotton-Cultivators; and I do hereby declare that the following is a full, clear, and exact description thereof, reference being had to the accompanying drawings, and to the letters of reference marked thereon, which form a part of this specification.

The nature of my invention consists in the construction and arrangement of a corn and cotton cultivator, as will be hereinafter fully set forth.

In order to enable others skilled in the art to which my invention appertains to make and use the same, I will now proceed to describe its construction and operation, referring to the annexed drawings, in which—

Figure 1 is a perspective view of my cultivator. Fig. 2 is a section of the scraper, and Fig. 3 is a front view of a single plow used in my cultivator.

A represents a plow-beam, with handles B B braced to the standard C, all constructed in any of the known and usual ways. Through the plow-beam A are two inclined slots, one in front of the other. In the front slot is inserted a bar, D, of steel or other suitable material, and held by a thumb-screw, a, for the purpose of being changed to any point desired, up or down, to accommodate the cultivator to the size of the horses or mules used. Below the beam A the bar D divides in two parts, one to each side. The ends are then bent downward and the rear edge of each twisted or turned forward, and the lower ends bent toward the rear, each of said branches forming a shank, on which a scraper, E, is attached. The twisted ends of the bar D are slotted vertically, and the scrapers are slotted horizontally, as shown. A temper-screw, b, is then passed through each scraper and its shank, securing the two together, and thus admitting of a double adjustment to the scrapers—namely, an up-and-down and a lateral adjustment. By this means not only the depth at which the scrapers are to work, but also their distance from the center may be easily regulated. In the rear slot on the beam A is in like manner inserted and adjusted a similarly-shaped bar, D', to which two shovel-plows, G G, are secured in the same manner, said plows being also slotted across or horizontally, so as to be capable of a double adjustment.

By this arrangement of scrapers and plows the operator is enabled to scrape both sides of a row of cotton or corn and to throw the soil to the plant at the same time and in one operation.

The bar D, with the scrapers E E, can be removed, and the bar D', with the plows G G, substituted in the front slot on the beam A when a single bar, H, with a plow, I, is placed in the rear slot to throw out the middle.

Having thus fully described my invention, what I claim as new, and desire to secure by Letters Patent, is—

1. The bar D, as constructed, in combination with scrapers E E or plows G G, arranged in the manner and for the purpose set forth.

2. A cultivator consisting of slotted beam A, handles B B, standard C, bars D D', scrapers E E, plows G G, and thumb-screws a a, all constructed and arranged as shown and described.

In testimony that I claim the foregoing as my own I affix my signature in presence of two witnesses.

LUTHER M. GANONG.

Witnesses:
T. H. ALEXANDER,
C. ALEXANDER.